United States Patent
Kwak et al.

(10) Patent No.: US 10,090,779 B2
(45) Date of Patent: Oct. 2, 2018

(54) METHOD AND SYSTEM FOR COMPENSATING FOR CURRENT SENSOR OFFSET OF INVERTER

(71) Applicant: Hyundai Motor Company, Seoul (KR)

(72) Inventors: Heon Young Kwak, Gyeonggi-do (KR); Gi Bong Son, Gyeonggi-do (KR); Hye Seung Kim, Gyeonggi-do (KR); Won Kyoung Choi, Gyeonggi-Do (KR)

(73) Assignee: Hyundai Motor Company, Seoul (KR)

(*) Notice: Subject to any disclaimer, the term of this patent is extended or adjusted under 35 U.S.C. 154(b) by 26 days.

(21) Appl. No.: 15/342,971

(22) Filed: Nov. 3, 2016

(65) Prior Publication Data
US 2017/0149354 A1 May 25, 2017

(30) Foreign Application Priority Data
Nov. 24, 2015 (KR) .................. 10-2015-0165015

(51) Int. Cl.
*H02M 7/44* (2006.01)
*H02M 7/5387* (2007.01)
*H02M 1/00* (2006.01)

(52) U.S. Cl.
CPC .......... *H02M 7/53875* (2013.01); *H02M 2001/0009* (2013.01); *Y02T 10/7258* (2013.01)

(58) Field of Classification Search
CPC .......................................... H02M 7/44
USPC ................................ 318/700, 34
See application file for complete search history.

(56) References Cited

U.S. PATENT DOCUMENTS

| 6,465,975 B1* | 10/2002 | Naidu ............. B62D 5/046 |
| | | 318/139 |
| 7,054,169 B2* | 5/2006 | Huh ............... H02M 3/33523 |
| | | 363/21.09 |
| 7,119,508 B2* | 10/2006 | Kurosawa ........ G11B 19/28 |
| | | 318/400.04 |

FOREIGN PATENT DOCUMENTS

| JP | 2005-348477 A | 12/2005 |
| JP | 2007-078377 A | 3/2007 |
| JP | 2007-159348 A | 6/2007 |
| JP | 2013-017363 A | 1/2013 |
| KR | 2013-0065415 A | 6/2013 |
| KR | 2015-0017503 A | 2/2015 |
| KR | 2015-0061702 A | 6/2015 |

* cited by examiner

*Primary Examiner* — David S Luo
(74) *Attorney, Agent, or Firm* — Mintz Levin Cohn Ferris Glovsky and Popeo, P.C.; Peter F. Corless

(57) ABSTRACT

A method of compensating for a current sensor offset of an inverter includes: calculating a current sensor offset based on an output value of a current sensor, which detects an output current of the inverter, after a vehicle has started and before a current control of the inverter is performed; actuating the inverter to perform the current control according to the calculated current sensor offset; determining whether the inverter enters a burst mode while performing the current control; and re-calculating the current sensor offset based on the output value of the current sensor when the inverter is determined to enter the burst mode.

15 Claims, 12 Drawing Sheets

METHOD AND SYSTEM FOR COMPENSATING FOR CURRENT SENSOR OFFSET OF INVERTER

CROSS REFERENCE TO RELATED APPLICATION

The present application claims the benefit of and priority to Korean Patent Application No. 10-2015-0165015, filed Nov. 24, 2015, wherein the entire contents of which are incorporated herein for all purposes by reference.

BACKGROUND OF THE DISCLOSURE

1. Technical Field

The present disclosure relates generally to a method of compensating for a current sensor offset of an inverter. More particularly, the present disclosure relates to a method and system of compensating for a current sensor offset of an inverter, which are capable of compensating for a current sensor offset due to a temperature change occurring in vehicle driving as well as in vehicle starting.

2. Description of the Related Art

As is well-known to those skilled in the art, a motor for driving an eco-friendly vehicle (e.g., hybrid vehicle or electric vehicle) can output a mechanical torque by a three-phase current having a phase difference of 120° generated by ON-OFF controls of six switches that configure an inverter. The three-phase current is an important factor for determining the torque of the motor and an important role of the inverter is to control the three-phase current.

The inverter requires information such as a direct current (DC) link voltage, a rotor position, or a three-phase current, etc., in order to control the three-phase current. A three-phase current sensor for obtaining the three-phase current among them is an essential component of the inverter.

Typically, most three-phase current sensors physically include an offset voltage (i.e., a voltage detected when a current is 0 A), and the offset voltage of the current sensor becomes a factor causing ripples to an output torque of a motor at the time of three-phase current control and becomes an element for hindering drivability. Accordingly, in order to address such a limitation, the offset voltage of the current sensor is typically compensated with a software-based method.

In addition, the three-phase current sensor has a property that the offset voltage varies at the time of temperature change. For example, when a vehicle travels for a certain time, since the temperature of the three-phase current sensor rises, it is necessary to continuously monitor an offset of the current sensor and compensate for the offset in view of an internal structure of the inverter.

For an existing current sensor offset compensating scheme, the current sensor offset compensation is performed, after it is determined whether a value is a normal offset wherein the value is obtained by passing a filter using a sensed output voltage of the current sensor in a state where a pulse-width modulation (PWM) control of an inverter switch becomes OFF at the time of turning-on a vehicle ignition (i.e., before a start of current control of the inverter).

In other words, since the current sensor offset is conventionally measured once and compensated at the time of ignition ON, a current sensor offset, which is varied by an increase in surrounding temperature due to continuous driving after the compensation, is not considered. Accordingly, a torque error may also occur in a torque output from a motor by the current sensor offset.

The torque error component appears in a sinusoidal wave type having the same frequency as a synchronous rotational frequency of a motor and the torque error appears as motor speed ripples in view of the vehicle, causing an inconvenience for the driver.

The topics described above are only intended to increase the understanding of the background of the present disclosure, and should not be recognized as being related art which is already known to those skilled in the art.

SUMMARY OF THE DISCLOSURE

Accordingly, the present disclosure has been made keeping in mind the above problems, and an object of the present disclosure is to provide a method and system of compensating for an current sensor offset of an inverter, which is capable of compensating for the current sensor offset due to a temperature change occurring in vehicle driving as well as in vehicle starting.

In accordance with embodiments of the present disclosure, a method of compensating for a current sensor offset of an inverter includes: calculating a current sensor offset based on an output value of a current sensor, which detects an output current of the inverter, after a vehicle has started and before a current control of the inverter is performed; actuating the inverter to perform the current control according to the calculated current sensor offset; determining whether the inverter enters a burst mode while performing the current control; and re-calculating the current sensor offset based on the output value of the current sensor when the inverter is determined to enter the burst mode.

The calculating of the current sensor offset may include: determining whether the output value of the current sensor is within a preset threshold range; and calculating the current sensor offset as equal to the output value of the current sensor when the output value of the current sensor is within the preset threshold range.

The calculating of the current sensor offset may further include: determining that the current sensor is in fault and the current control of the inverter is not performed when the output value of the current sensor is outside of the threshold range.

The calculating of a current sensor offset may include: determining whether the output value of the current sensor is deviated from a preset upper limit or a preset lower limit; and determining that the current sensor is in open-circuit fault or short-circuit fault, when the output value of the current senor is deviated from the preset upper limit or the preset lower limit.

The determining of whether the inverter enters the burst mode may include: determining that the inverter enters the burst mode when an absolute value of a torque command input to a current command map is less than a preset first threshold value, and an inverse magnetic flux value of a motor driven by a current received from the inverter is less than a preset second threshold value.

The re-calculating of the current sensor offset may include: determining whether the output value of the current sensor is within a preset threshold range after the inverter enters the burst mode; and updating the current sensor offset according to the output of the current sensor when the output value of the current sensor is within the preset threshold range.

The re-calculating of the current sensor offset may further include: determining that the current sensor is in fault and the current control of the inverter is not performed after the inverter enters the burst mode and when the output value of the current sensor is outside of the threshold range.

The re-calculating of the current sensor offset may include: determining whether output value of the current sensor is deviated from a preset upper limit or a preset lower limit after the inverter enters the burst mode; and determining that the current sensor is in open-circuit fault or short-circuit fault, when the output value of the current senor is deviated from the preset upper limit or the preset lower limit.

Furthermore, in accordance with embodiments of the present disclosure, a method of compensating for a current sensor offset of an inverter includes: calculating a current sensor offset as equal to an output of the current sensor as after a vehicle has started and before a current control of the inverter is performed, and when the output of the current senor, which detects an output current of the inverter, is in a preset threshold range; actuating the inverter to perform the current control according to the calculated current sensor offset; determining whether the inverter enters a burst mode by comparing an absolute value of a torque command, which is input to a current command map applied to the current control of the inverter, with a preset first threshold value, and comparing an inverse magnetic flux value of a motor driven by a current received from the inverter with a preset second threshold value; and re-calculating the current sensor offset based on the output value of the current sensor when the inverter is determined to enter the burst mode.

Furthermore, in accordance with embodiments of the present disclosure, a method of compensating for a current sensor offset of an inverter includes: determining whether the inverter enters a burst mode while a current control of the inverter in a vehicle is performed while the vehicle is being driven; and calculating a current sensor offset based on an output value of a current sensor when the inverter is determined to enter the burst mode.

The determining of whether the inverter enters the burst mode may include: determining that the inverter enters the burst mode when an absolute value of a torque command input to a current command map is less than a preset first threshold value and an inverse magnetic flux value of a motor driven by a current received from the inverter is less than a preset second threshold value.

The calculating of the current sensor offset may include: determining whether the output value of the current sensor is within a preset threshold range after the inverter enters the burst mode; and updating the current sensor offset according to the output of the current sensor when the output value of the current sensor is within the preset threshold range.

The calculating of the current sensor offset may further include: determining that the current sensor is in fault and the current control of the inverter is not performed after the inverter enters the burst mode and when the output value of the current sensor is outside of the threshold range.

The calculating of the current sensor offset may include: determining whether the output value of the current sensor is deviated from a preset upper limit or a preset lower limit after the inverter enters the burst mode; and determining that the current sensor is in open-circuit fault or short-circuit fault, when the output value of the current senor is deviated from the preset upper limit or the preset lower limit.

Furthermore, in accordance with embodiments of the present disclosure, a system of compensating for a current sensor offset of an inverter includes: a current sensor detecting an output current of the inverter and outputting the output current; an offset compensating unit calculating an offset of the current sensor based on the output value of the current sensor; and a current control unit controlling the output current of the inverter according to a compensation value for compensating for the offset of the current sensor from the output value of the current sensor and a current command determined by a current command map. The offset compensating unit calculates the current sensor offset based on the output value of the current sensor, which detects the output current of the inverter, after a vehicle has started and before a current control is performed on the inverter, and re-calculates the current sensor offset based on the output value of the current sensor, when the inverter is determined to enter the burst mode while performing the current control.

BRIEF DESCRIPTION OF THE DRAWINGS

The above and other objects, features and advantages of the present disclosure will be more clearly understood from the following detailed description taken in conjunction with the accompanying drawings, in which.

Figure 1:
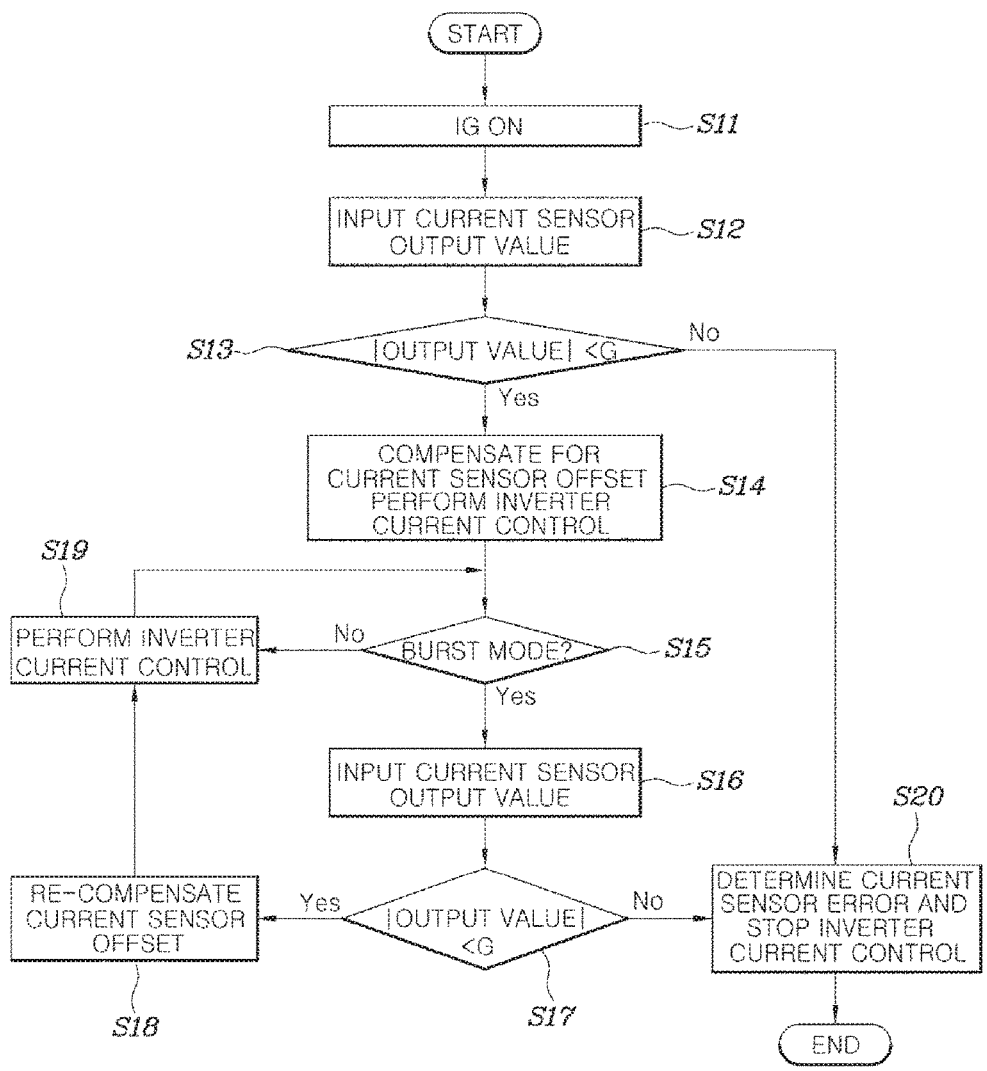
FIG. 1 is a flowchart of a method for compensating for a current sensor offset of an inverter according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

Furthermore, the control unit of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinafter, embodiments of the present disclosure will be described in detail with reference to the attached drawings. Reference is now made to the drawings, in which the same reference numerals are used throughout the different drawings to designate the same or similar components.

FIG. 1 is a flowchart of a method for compensating for a current sensor offset of an inverter according to embodiments of the present disclosure.

As shown in FIG. 1, a method of compensating for a current sensor offset of an inverter according to embodiments of the present disclosure may include: a first calculation step (s12) for calculating a current sensor offset based on an output value of a current sensor before a current control of an inverter is performed after a vehicle is started (step S11), a current control step (S14) for reflecting the current sensor offset detected in the first calculating step (S12) and performing a current control of an inverter, a determining step (S15) for determining whether to enter a burst mode of the inverter during the current control step (S14), and a second calculating step (S17) for recalculating the current senor offset based on the output value of the current sensor when it is determined that the inverter enters the burst mode.

In this way, embodiments of the present disclosure include a process for compensating for a current sensor offset before a current control of the inverter is performed at the time of starting a vehicle and a process for compensating the current sensor offset during the vehicle is driven through the current control of the inverter.

In addition to the process of compensating for the current sensor offset before the current control of the inverter, embodiments of the present disclosure further include the process of additional compensation for the current sensor of the inverter even in the vehicle driving. Accordingly, since the current sensor offset, which is varied by heat occurring during the vehicle driving, is compensated and the current control of the inverter is performed, a torque error of the motor, which occurs due to an error in current offset, may be reduced to solve inconvenience delivered to a vehicle driver.

Figure 2:
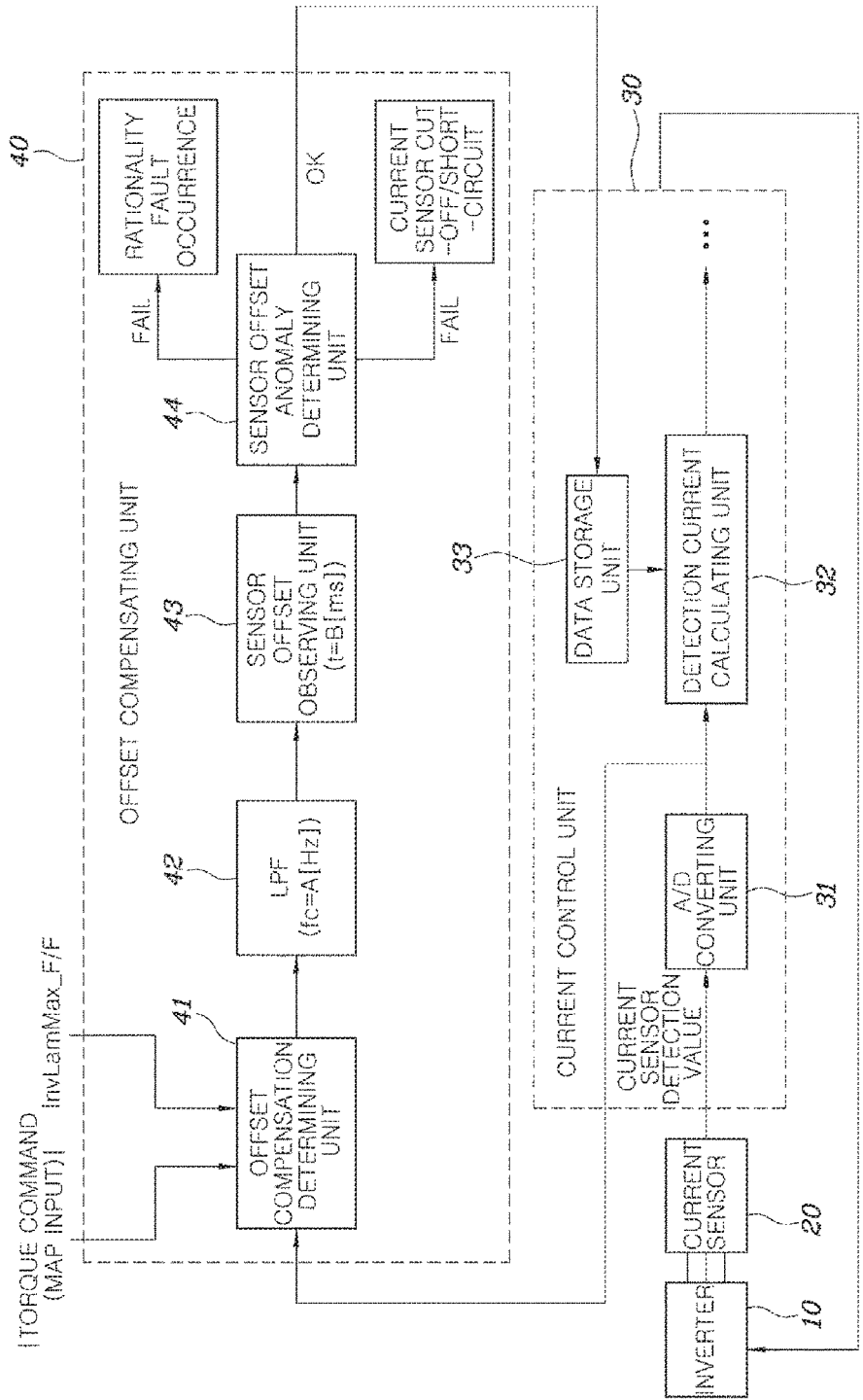
FIG. 2 is a block configuration diagram of a system to which a method for compensating for a current sensor of an inverter is applied according to embodiments of the present disclosure.
Figure 3:
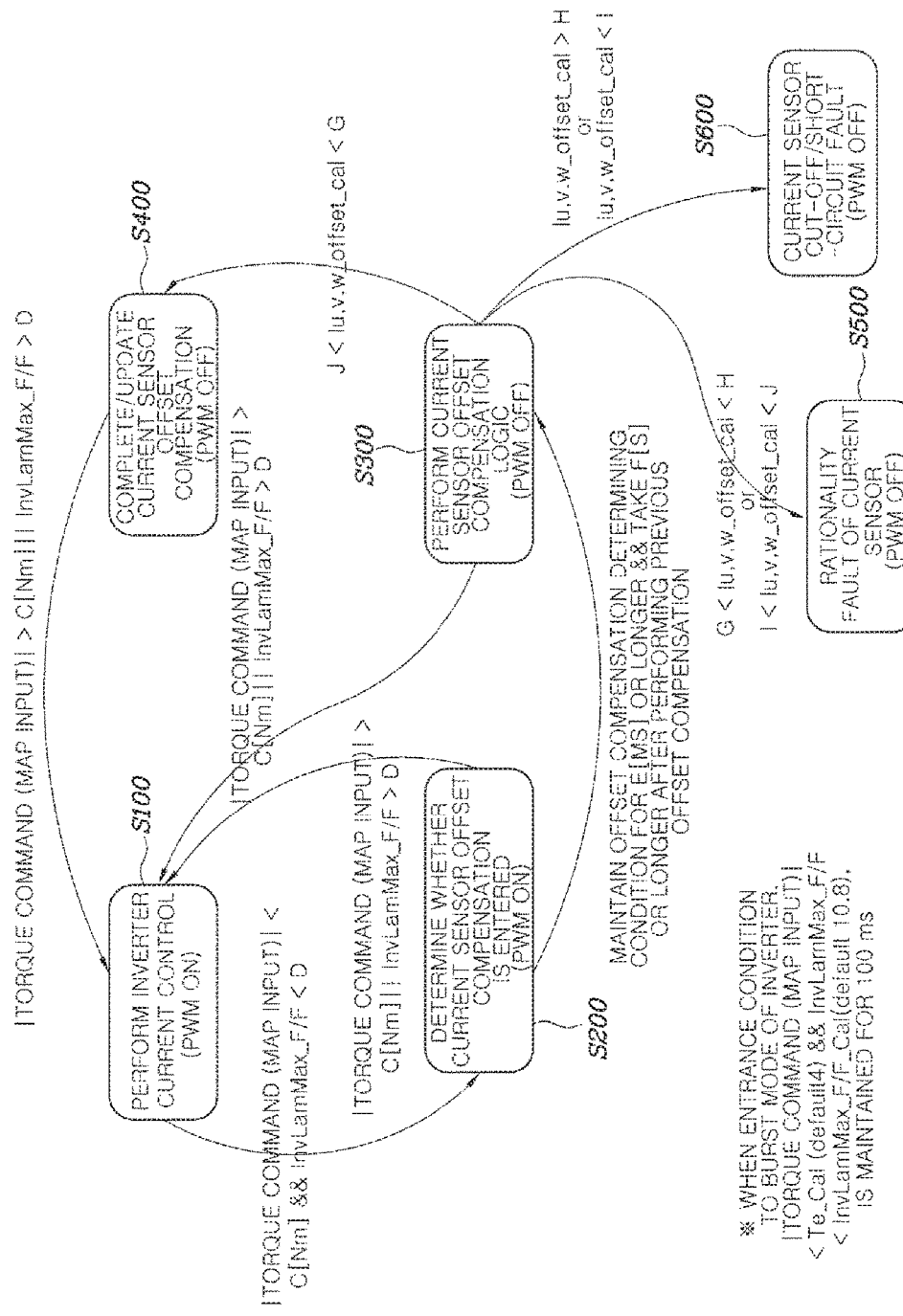
FIG. 3 is a control state diagram of a method for compensating for a current sensor offset of an inverter according to embodiments of the present disclosure.
Figure 4A:
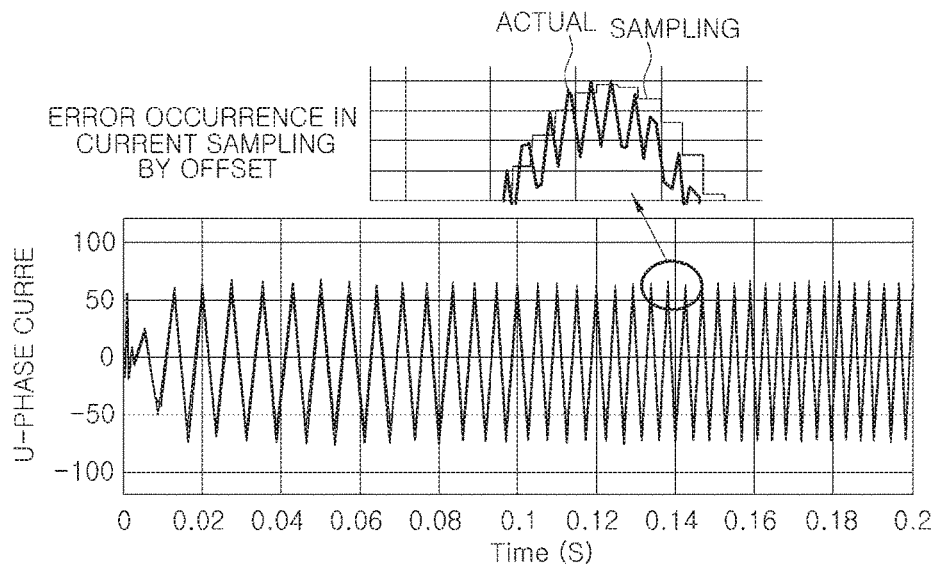
FIGS. 4A to 4C and 5A to 5C illustrate comparison results where ripples of an output torque are simulated when a typical current sensor offset compensation method and a current sensor offset compensation method according to embodiments of the present disclosure are applied.
Figure 4B:
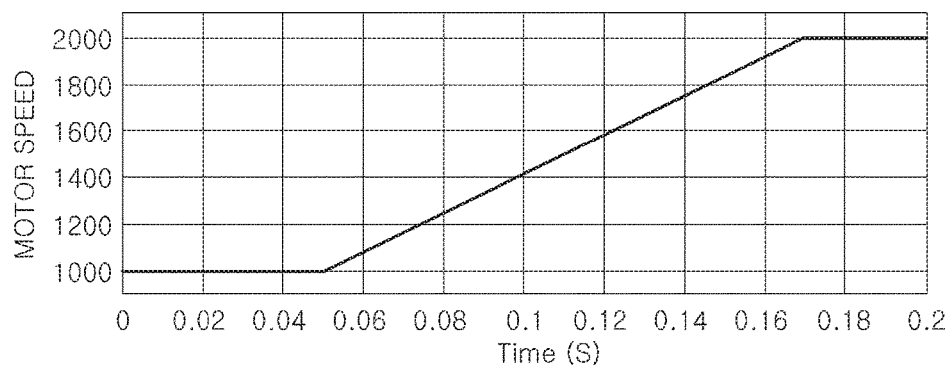
Figure 4C:
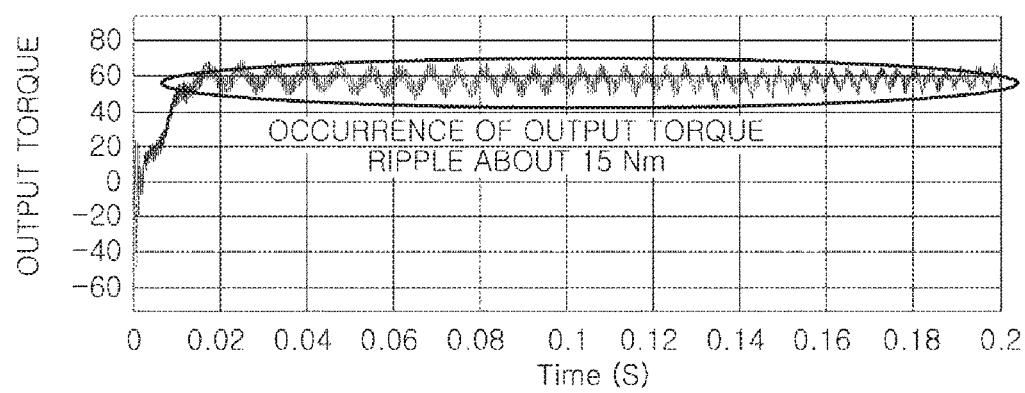
Figure 5A:
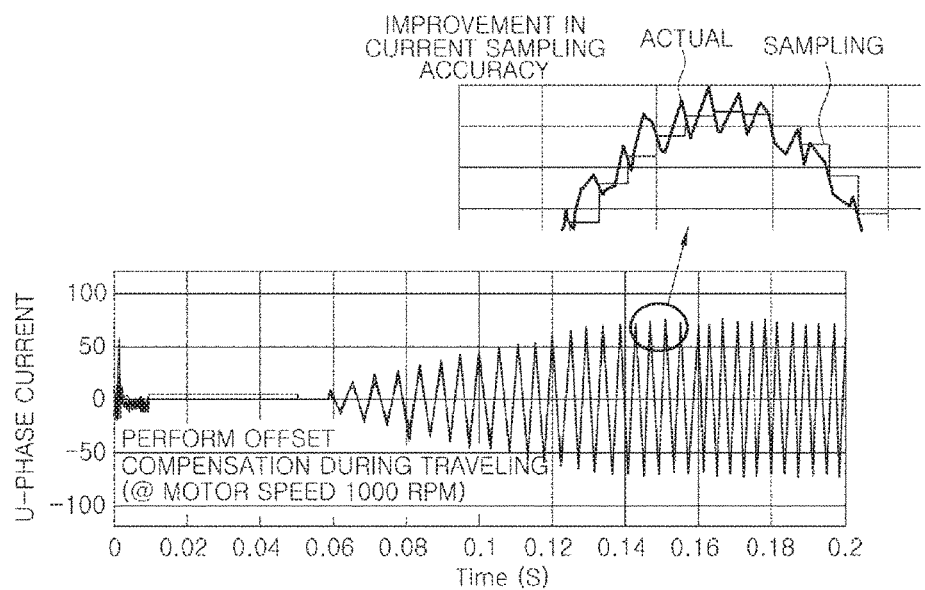
Figure 5B:
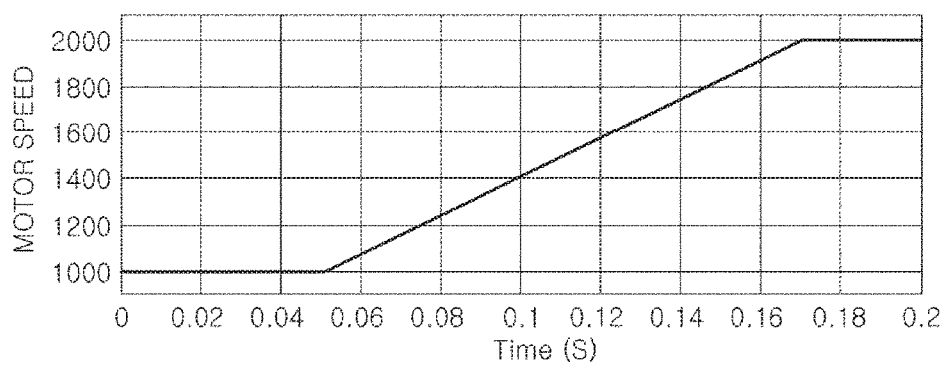
Figure 5C:
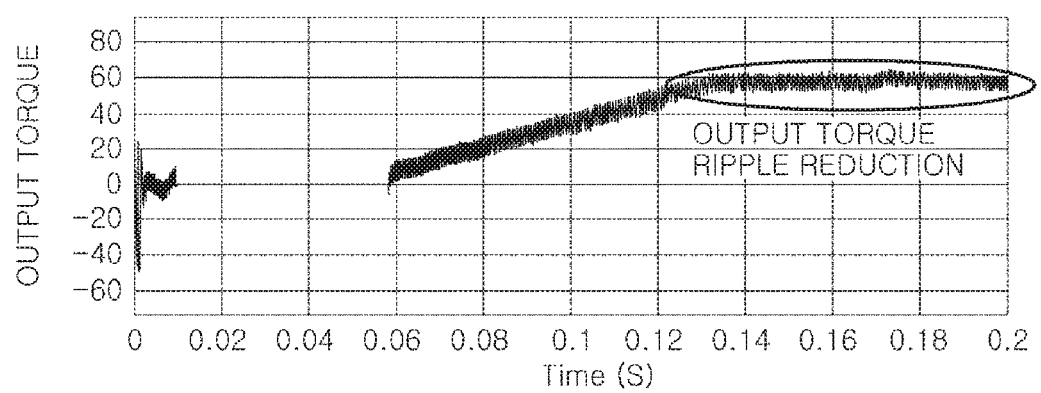
Figure 6A:
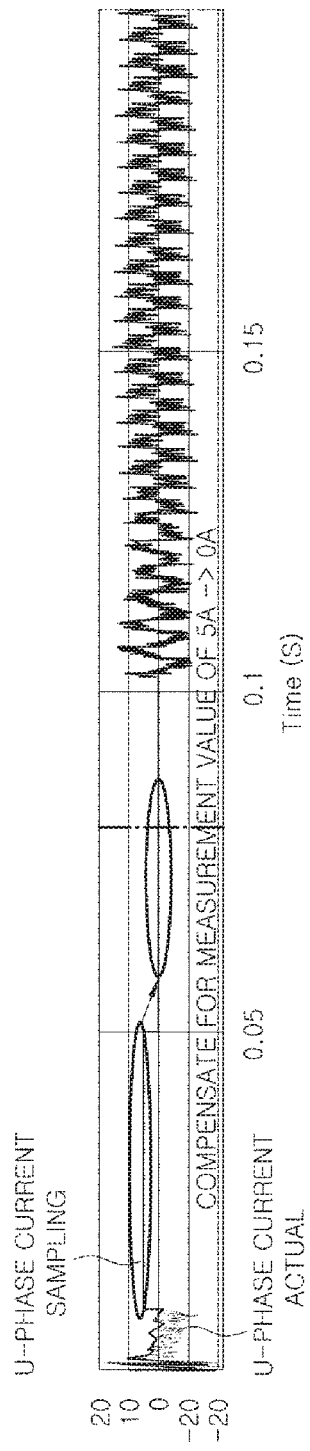
FIGS. 6A to 6E illustrate content related to a frequency of offset compensation mode occurrence in a method for compensating for a current sensor offset of an inverter according to embodiments of the present disclosure.
Figure 6B:
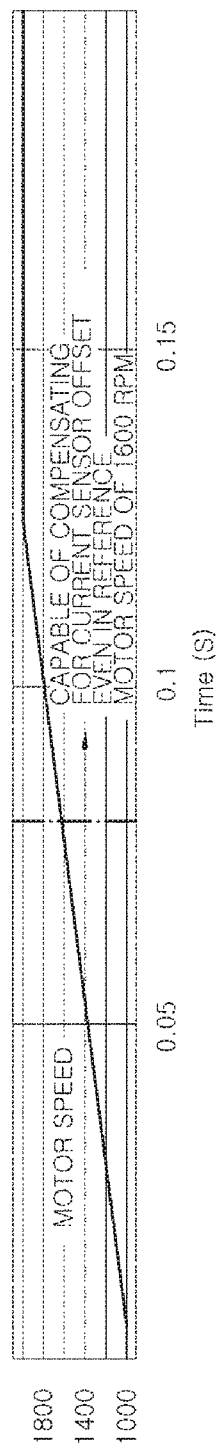
Figure 6C:
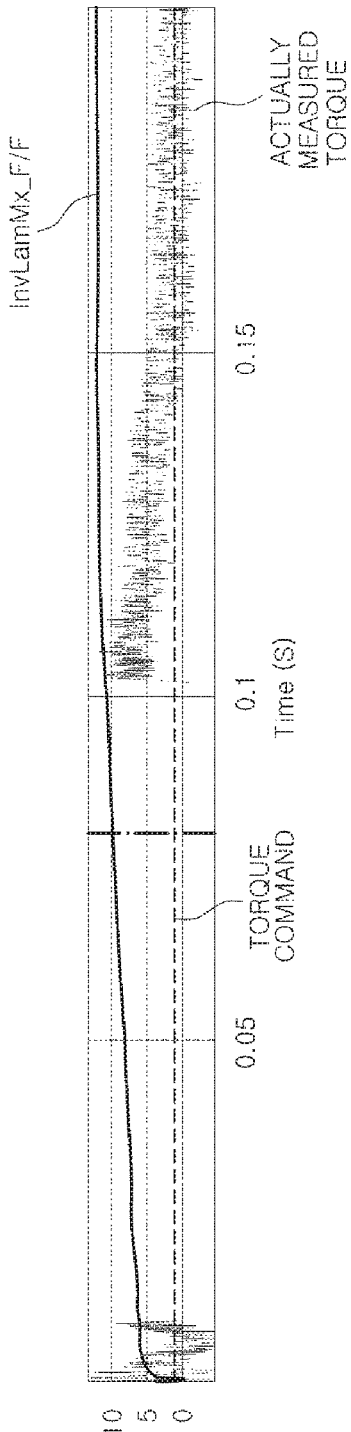
Figure 6D:
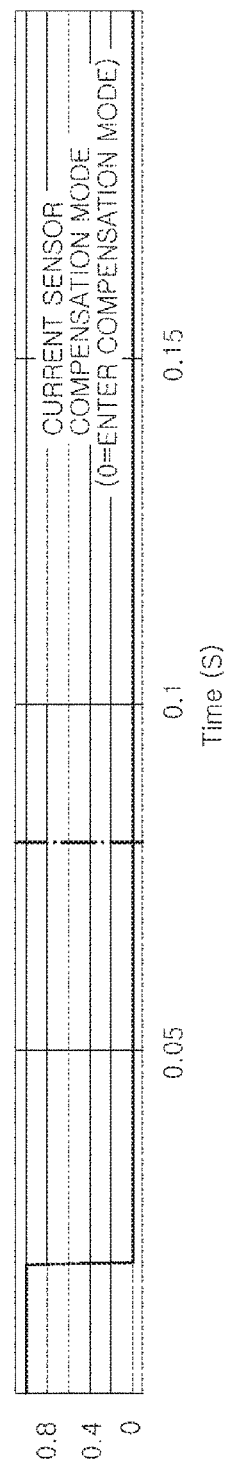
Figure 6E:
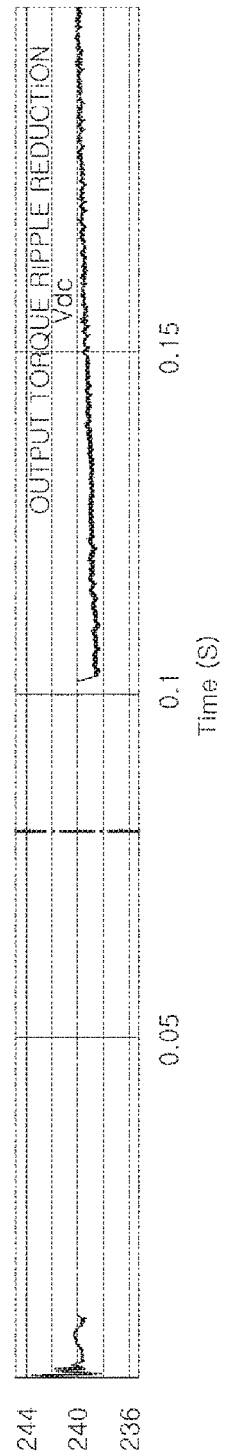

FIG. 2 is a block configuration diagram of a system to which a method for compensating for a current sensor offset of an inverter is applied according to embodiments of the present disclosure. In addition, FIG. 3 is a control state diagram of a method for compensating for a current sensor offset of an inverter according to embodiments to the present disclosure, and is a control state diagram of a current sensor offset compensation method performed in a process for a current control of an inverter.

Hereinafter, a method of compensating for a current sensor offset of an inverter according to embodiments of the present disclosure will be described in detail with reference to FIGS. 1 to 3.

A method of compensating for a current sensor offset of an inverter according to embodiments of the present disclosure includes starting (step S11) a vehicle, receiving (step S12) an output value of a current sensor 20 provided for each phase at an three-phase power output side of an inverter 10 before a current control of the inverter 10 is performed, which provides three-phase power to a vehicle motor, and determining (step S13) a current sensor offset based on the received output value.

After the starting (step S11) of the vehicle and before the current control of the inverter 10 is performed, since a current output from the inverter 10 is 0, the output value output from the current sensor 20 may be an offset of the corresponding current sensor 20.

The output value from the current sensor 20 may be provided, for a digital calculation control, to an analog/digital converting unit 31 of a current control unit 30, and a current sensor output value converted by the analog/digital converting unit 31 is provided to an offset compensating unit 40. An offset compensation determining unit 41 of the offset compensating unit 40 is an element for determining whether to compensate for the offset and may pass, without an additional determination, a current sensor detection value, which is input before the current control of the inverter 10 is performed after the vehicle is started (step S11).

A low-pass filter 42 of the offset compensating unit 40 removes a high frequency component from the input current sensor detection value, and a sensor offset observing unit 42 may observe the current sensor detection value during a time preset in consideration of a delay by the low-pass filter 42.

In an embodiment of the present disclosure, after the vehicle is started (step S11) and before the current control of the inverter 10 is performed, it may be determined whether an output value output from the current sensor 20 is an offset (step 13).

For example, in step S13, a sensor offset anomaly determining unit 43 of the offset compensating unit 40 may determine whether the output value of the current sensor 20 is in a preset range ±G. Typically, the offset of the current sensor depends on a hardware specification. There is a specification of linearity or the offset of the current sensor itself, and for the inverter 10, boundary values ±G of the preset range may be determined by selecting allowances of hardware including all related circuits from the current sensor 20 to a controller, which receives a sensing voltage.

In step S13, when the output value of the current sensor 20 is out of the preset range ±G, the sensor offset anomaly determining unit 44 may determine that a fault occurs in the current sensor (step S20). In this case, the inverter current control may not be performed later.

In addition, in step S13, the sensor offset anomaly determining unit 43 of the offset compensating unit 40 may determine whether the output value of the current sensor 20 is deviated from a preset upper limit or lower limit, and when deviated from the preset upper or lower limit, may determine that the current sensor is in open-circuit fault or short-circuit fault.

When the output value of the current sensor 20 is determined as a proper offset (i.e., a case where the output value of the current sensor 20 is within the preset range) through the foregoing steps S11 to S13, the current sensor offset is stored in a data storage unit 33 (e.g., EEPROM, RAM, ROM, HDD, SDD, etc.) of the current control unit 30 and a detection current calculation unit 32 of the current control unit 30 may reflect the current sensor offset stored in the data storage unit 33 in calculating a actual physical current value and may accordingly current-control the inverter. For example, the detection current calculation unit 32 may subtract the current sensor offset from a value, which is digitally converted from the current sensor detection value and is output from the A/D converting unit 31, and may multiply the subtracted value by a preset scaling constant to calculate an actual current value. The technology for controlling the current of the inverter 10 to satisfy a torque command, which is input from an outside source, by using the current detection value detected by the current sensor may be obtained by applying various known techniques in the art, and accordingly a detailed description thereabout will be omitted.

As described above, after the vehicle is started and before a current control of the inverter 10 is performed, an offset of the current sensor 20 is compensated and accordingly whether the inverter enters a burst mode may be continuously determined (step S15) in a state where a pulse width modulation (PWM) control for a switching element of the inverter 10 is performed (step S100 of FIG. 3).

In step 15, the offset compensation determining unit 41 of the offset compensation unit 40 compares an absolute value of a torque command, which is input to a current command map for determining a current command for a control of the inverter 10, and an inverse flux value InvLamMax_F/F of a motor, which is driven by a current received from the inverter 10, with preset threshold values to determine whether the inverter 10 enters the burst mode.

The burst mode is a mode for reducing a switching loss of the inverter 10 to raise fuel efficiency by regarding that a torque output is not necessary and not performing a current control and switching of the inverter 10, when a current command map input torque value is smaller than a preset first threshold value and a value of the inverse magnetic flux InvLamMax_F/F, which is calculated on the basis of a current link voltage and a motor speed, is smaller than a preset second threshold value.

In a state where the current control of the inverter is not performed, when the motor speed Wrpm is raised and a back electromotive force (EMF) voltage of the motor becomes greater than a DC link voltage Vdc, current flows through a reverse diode included in each switching element of the inverter 10. In the burst mode, since the switching is OFF only in an area where the back EMF voltage of the motor is less than the DC link voltage Vdc through the inverse magnetic flux value InvLamMax F/F, a current is not generated to a three-phase output end of the inverter 10.

Accordingly, in step S15, when a torque command, which is input to the current command map, is less than the preset first threshold and the inverse magnetic flux value InvLamMax F/F of the motor is less than the preset second threshold value, it is determined that the inverter enters the burst mode and a subsequent current sensor offset compensation process is proceeded.

Since a torque output of at least several tens of Nm is necessary to move the vehicle, it may be determined that a torque command smaller than the several tens of Nm may be neglected and accordingly the first threshold value may be set to several Nm. The first threshold value may be set through a driving test in a state where a real vehicle is provided. In addition, the second threshold value may be set with a certain margin from a maximum value among values of the inverse magnetic flux InvLamMax under which driving is possible in a maximum torque per ampere (MTPA) on a flux-based current command map.

In step S15, when it is not determined that the inverter 10 enters the burst mode, the previous inverse current control may be continuously performed (step S19).

Such a process relates to a state conversion to a state S200 where whether to enter the current sensor offset compensation is determined, when the inverter 10 enters the burst mode in a state S100 where the PWM control is performed on the switching element of the inverter 10 in the state diagram of FIG. 3.

Then when it is determined to enter the burst mode in step S15, like the foregoing step S12, a current sensor output value is input to the offset compensation unit S40 in step S16, and like the foregoing step S13, it may be determined whether the current sensor output value becomes a proper offset (step S16). The processes performed in steps S16 and S17 are substantially identical to those in steps S12 and S13, and overlapping descriptions will be omitted. However, in step S17, it is determined whether a preset time has elapsed after previous current sensor offset compensation is performed and when the preset time has elapsed, current sensor offset compensation is performed.

Next, as described in relation to step S14, the current sensor offset is stored in the data storage unit 33 of the current control unit 30 to update a previous current sensor offset (step S18), and the updated current sensor offset is applied to perform an inverter current control (step S19).

In step S17, when the output value of the current sensor 20 is out of the preset range ±G, the sensor offset anomaly determining unit 44 may determine that a fault occurs in the current sensor and may stop the inverter current control (step S20).

In addition, in step S17, the sensor offset anomaly determining unit 43 of the offset compensating unit 40 determines whether the output value of the current sensor 20 is deviated from a preset upper limit or lower limit, and when deviated from the preset upper or lower limit, may determine that the current sensor is cut off or short-circuited.

Such a process is shown as a process of state conversion to a state S300 where a current sensor offset compensation logic is executed, when it is determined that a constant current sensor detection value is maintained for a preset time or longer and that a certain time has elapsed after the previous offset compensation. In addition, it is determined whether the current sensor output value may be the proper offset in the state S300 and when it is determined as the proper offset, conversion is performed to a state S400. When the current sensor output value is not the proper offset, the conversion is performed to a state S500 where the current sensor is determined to be in fault or to a state S600 where the current sensor is determined to be cut off or short-circuited.

FIGS. 4A to 4C and 5A to 5C illustrate comparison results where ripples of an output torque are simulated when a typical current sensor offset compensation method and a current sensor offset compensation method according to embodiments of the present disclosure are applied.

In particular, waveforms shown in FIGS. 4 and 5 are results of simulating a case 5A where there is an offset in a U-phase current sensor. As shown in FIG. 4, in a case where it is not possible to re-compensate for the current sensor offset with an existing current sensor offset compensation scheme during driving, a ripple (e.g., 15 Nm) occurs in an output torque in comparison to a motor torque command. The torque of 15 Nm is a value of a level that a driver may sufficiently feel and a number that may continuously cause a sense of shock during driving. On the other hand, according to the current sensor offset compensation scheme that is applied to the embodiments of the present disclosure as illustrated in FIG. 5, the current sensor offset occurring according to a temperature rise of the inverter due to long time traveling is constantly compensated to reduce ripples and an output torque, which substantially corresponds to a torque command, may be obtained.

FIGS. 6A to 6E illustrates content related to a frequency of offset compensation mode occurrence in a method for compensating for a current sensor offset of an inverter according to embodiments of the present disclosure.

As illustrated in FIG. 6, it may be seen that then current sensor offset compensation is performed, while a motor speed increases from 1000 rpm to 1600 rpm. Conventionally, compensation is performed only at the time of the ignition turning-on (IG ON) and is not performed on a current sensor offset that may occur according to an increase in temperature at the time of traveling. However, in a case where the present technology is applied, compensation may be performed over a wide area (i.e., speed) even in the traveling.

According to the method and system of compensating for a current sensor offset of an inverter as described above, in addition to a process of compensating for a current sensor offset before a current control of an inverter is performed, a process of additional compensation for the current sensor of the inverter is performed even in vehicle driving. Accordingly, since the current sensor offset, which is varied by heat occurring during the vehicle driving, is compensated and the current control of the inverter is performed, a motor torque error, which occurs due to an error of a current offset, may be reduced to remarkably solve inconvenience faced by a driver of the vehicle.

Although the embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A method of compensating for a current sensor offset of an inverter, the method comprising:
   calculating a current sensor offset based on an output value of a current sensor, which detects an output current of the inverter, after a vehicle has started and before a current control of the inverter is performed;
   actuating the inverter to perform the current control according to the calculated current sensor offset;
   determining whether the inverter enters a burst mode while performing the current control; and
   re-calculating the current sensor offset based on the output value of the current sensor when the inverter is determined to enter the burst mode.

2. The method of claim 1, wherein the calculating of the current sensor offset comprises:
   determining whether the output value of the current sensor is within a preset threshold range; and
   calculating the current sensor offset as equal to the output value of the current sensor when the output value of the current sensor is within the preset threshold range.

3. The method of claim 2, wherein the calculating of the current sensor offset further comprises:
   determining that the current sensor is in fault and the current control of the inverter is not performed when the output value of the current sensor is outside of the threshold range.

4. The method of claim 1, wherein the calculating of the current sensor offset comprises:
   determining whether the output value of the current sensor is deviated from a preset upper limit or a preset lower limit; and
   determining that the current sensor is in open-circuit fault or short-circuit fault when the output value of the current senor is deviated from the preset upper limit or the preset lower limit.

5. The method of claim 1, wherein the determining of whether the inverter enters the burst mode comprises:
   determining that the inverter enters the burst mode when an absolute value of a torque command input to a current command map is less than a preset first threshold value, and an inverse magnetic flux value of a motor driven by a current received from the inverter is less than a preset second threshold value.

6. The method of claim 1, wherein the re-calculating of the current sensor offset comprises:
   determining whether the output value of the current sensor is within a preset threshold range after the inverter enters the burst mode; and
   updating the current sensor offset according to the output of the current sensor when the output value of the current sensor is within the preset threshold range.

7. The method of claim 6, wherein the re-calculating of the current sensor offset further comprises:
   determining that the current sensor is in fault and the current control of the inverter is not performed after the inverter enters the burst mode and when the output value of the current sensor is outside of the threshold range.

8. The method of claim 1, wherein the re-calculating of the current sensor offset comprises:
   determining whether the output value of the current sensor is deviated from a preset upper limit or a preset lower limit after the inverter enters the burst mode; and
   determining that the current sensor is in open-circuit fault or short-circuit fault when the output value of the current senor is deviated from the preset upper limit or the preset lower limit.

9. A method of compensating for a current sensor offset of an inverter, the method comprising:
   calculating a current sensor offset as equal to an output of the current sensor as after a vehicle has started and before a current control of the inverter is performed, and when the output of the current senor, which detects an output current of the inverter, is in a preset threshold range;
   actuating the inverter to perform the current control according to the calculated current sensor offset;
   determining whether the inverter enters a burst mode by comparing an absolute value of a torque command, which is input to a current command map applied to the current control of the inverter, with a preset first threshold value, and comparing an inverse magnetic flux value of a motor driven by a current received from the inverter with a preset second threshold value; and re-calculating the current sensor offset based on the output value of the current sensor when the inverter is determined to enter the burst mode.

10. A method of compensating for a current sensor offset of an inverter, the method comprising:

determining whether the inverter enters a burst mode while a current control of the inverter in a vehicle is performed while the vehicle is being driven; and calculating a current sensor offset based on an output value of a current sensor when the inverter is determined to enter the burst mode.

11. The method of claim 10, wherein the determining of whether the inverter enters the burst mode comprises:

determining that the inverter enters the burst mode when an absolute value of a torque command input to a current command map is less than a preset first threshold value and an inverse magnetic flux value of a motor driven by a current received from the inverter is less than a preset second threshold value.

12. The method of claim 10, wherein the calculating of the current sensor offset comprises:

determining whether the output value of the current sensor is within a preset threshold range after the inverter enters the burst mode; and updating the current sensor offset according to the output of the current sensor when the output value of the current sensor is within the preset threshold range.

13. The method of claim 12, wherein the calculating of current sensor offset further comprises:

determining that the current sensor is in fault and the current control of the inverter is not performed after the inverter enters the burst mode and when the output value of the current sensor is outside of the threshold range.

14. The method of claim 10, wherein the calculating of the current sensor offset comprises:

determining whether the output value of the current sensor is deviated from a preset upper limit or a preset lower limit after the inverter enters the burst mode; and determining that the current sensor is in open-circuit fault or short-circuit fault when the output value of the current senor is deviated from the preset upper limit or the preset lower limit.

15. A system of compensating for a current sensor offset of an inverter, the system comprising:

a current sensor detecting an output current of the inverter and outputting the output current;

an offset compensating unit calculating an offset of the current sensor based on the output value of the current sensor; and a current control unit controlling the output current of the inverter according to a compensation value for compensating for the offset of the current sensor from the output value of the current sensor and a current command determined by a current command map, wherein the offset compensating unit calculates the current sensor offset based on the output value of the current sensor, which detects the output current of the inverter, after a vehicle has started and before a current control is performed on the inverter, and re-calculates the current sensor offset based on the output value of the current sensor, when the inverter is determined to enter the burst mode while performing the current control.

* * * * *